(12) United States Patent
Hu et al.

(10) Patent No.: US 12,479,719 B2
(45) Date of Patent: Nov. 25, 2025

(54) MEMS STRUCTURE

(71) Applicant: TAIWAN SEMICONDUCTOR MANUFACTURING COMPANY LTD., Hsinchu (TW)

(72) Inventors: Fan Hu, Taipei (TW); Wen-Chuan Tai, Hsinchu (TW); Li-Chun Peng, Hsin-Chu (TW); Hsiang-Fu Chen, Hsinchu County (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 692 days.

(21) Appl. No.: 17/724,157

(22) Filed: Apr. 19, 2022

(65) Prior Publication Data

US 2023/0331546 A1  Oct. 19, 2023

(51) Int. Cl.
*B81C 3/00* (2006.01)
*B81B 7/00* (2006.01)

(52) U.S. Cl.
CPC ............ *B81C 3/001* (2013.01); *B81B 7/0038* (2013.01); *B81B 7/0083* (2013.01); *B81C 2201/0118* (2013.01); *B81C 2203/0109* (2013.01); *B81C 2203/0172* (2013.01)

(58) Field of Classification Search
CPC ....... B81B 7/0035–0041; B81B 7/0083–0096; B81B 7/0038; B81B 2207/012; B81B 2207/095; B81B 2207/096; B81C 3/001; B81C 2201/0118; B81C 2203/0109; B81C 2203/0172

See application file for complete search history.

(56) References Cited

U.S. PATENT DOCUMENTS

| | | | |
|---|---|---|---|
| 2015/0191345 A1* | 7/2015 | Boysel ................ | B81C 1/00301 438/106 |
| 2017/0107100 A1* | 4/2017 | Cheng ................. | B81C 1/00293 |
| 2018/0127263 A1* | 5/2018 | Tai ........................ | B81B 3/0008 |
| 2019/0092627 A1* | 3/2019 | Lin ........................ | H01L 24/09 |
| 2020/0223688 A1* | 7/2020 | Chang ................... | B81B 7/0038 |

* cited by examiner

*Primary Examiner* — Steven B Gauthier
*Assistant Examiner* — Sun Mi Kim King
(74) *Attorney, Agent, or Firm* — WPAT LAW; Anthony King

(57) ABSTRACT

A MEMS package is provided. The MEMS package includes a metallization layer, a planarization structure, a MEMS device structure, a cap structure and a pressure adjustment element. The planarization structure has an inner sidewall defining a first cavity exposing the metallization layer. The MEMS device structure is bonded to the planarization structure. The MEMS device structure includes a movable element over the first cavity. The cap structure is bonded to the MEMS device structure and has an inner sidewall defining a second cavity facing the movable element. The pressure adjustment element is disposed in the second cavity.

20 Claims, 10 Drawing Sheets

MEMS STRUCTURE

BACKGROUND

The semiconductor industry has experienced rapid growth and demands for highly integrated semiconductor devices are increasing. Microelectromechanical systems (MEMS) devices, such as motion sensors, pressure sensors, microphones, accelerometers and gyroscopes, have found use in many electronic devices. In particular, motion sensors, accelerometers and microphones are commonly used in tablet computers, laptop computers and smartphones. However, the steps taken to meet these demands have increased the complexity of processing and manufacturing semiconductor devices for integrated circuits (ICs) and, for these demands to be met, similar developments in IC processing and manufacturing are needed.

BRIEF DESCRIPTION OF THE DRAWINGS

Aspects of the embodiments of the present disclosure are best understood from the following detailed description when read with the accompanying figures. It should be noted that, in accordance with the standard practice in the industry, various structures are not drawn to scale. In fact, the dimensions of the various structures may be arbitrarily increased or reduced for clarity of discussion.

DETAILED DESCRIPTION

Figure 1:
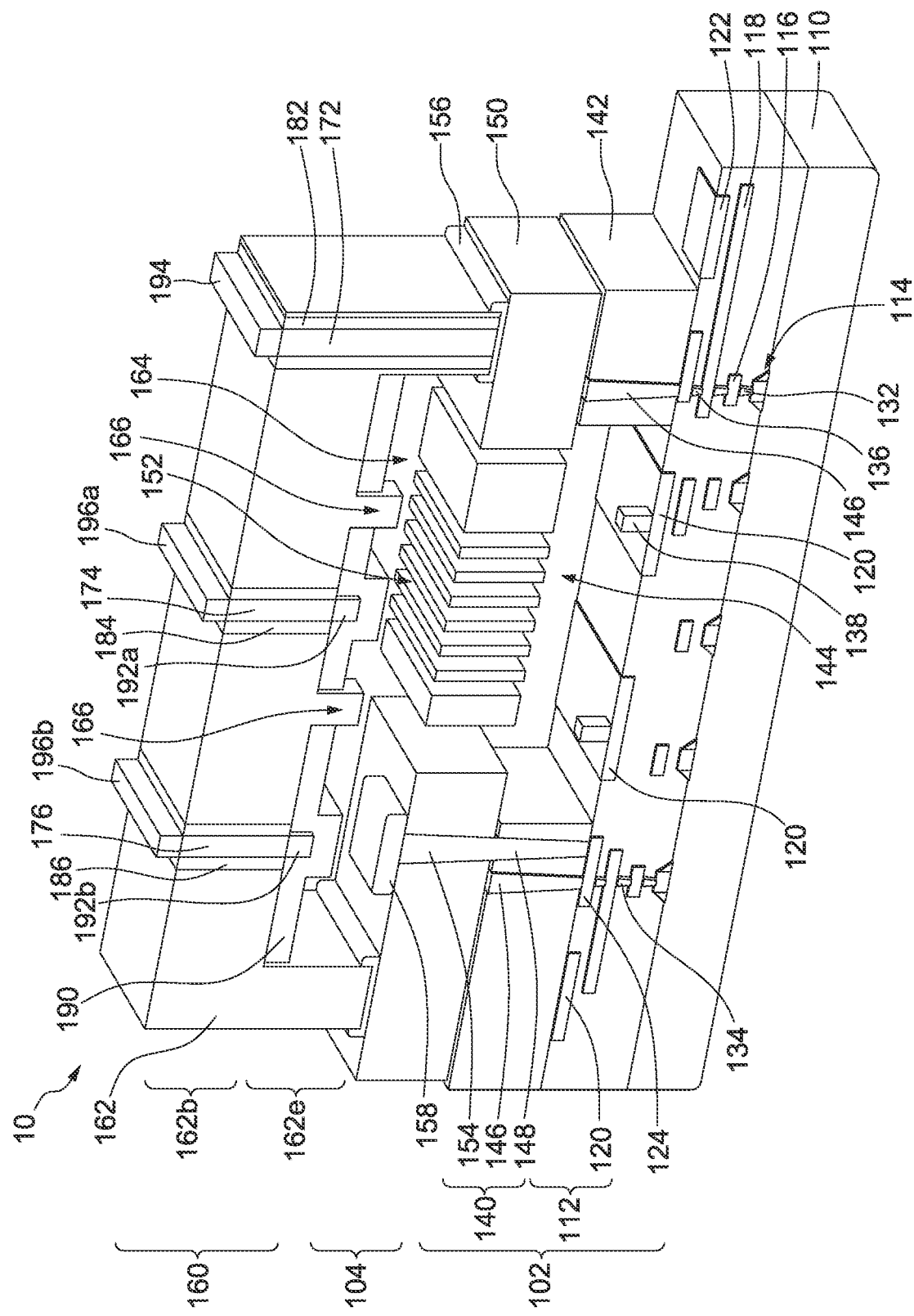
FIG. 1 is a schematic view of a MEMS package according to aspects of one or more embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "over," "upper," "on," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, although the terms such as "first," "second" and "third" describe various elements, components, regions, layers and/or sections, these elements, components, regions, layers and/or sections should not be limited by these terms. These terms may be only used to distinguish one element, component, region, layer or section from another. The terms such as "first," "second" and "third" when used herein do not imply a sequence or order unless clearly indicated by the context.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the terms "substantially," "approximately" or "about" generally mean within a value or range that can be contemplated by people having ordinary skill in the art. Alternatively, the terms "substantially," "approximately" or "about" mean within an acceptable standard error of the mean when considered by one of ordinary skill in the art. People having ordinary skill in the art can understand that the acceptable standard error may vary according to different technologies. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "substantially," "approximately" or "about." Accordingly, unless indicated to the contrary, the numerical parameters set forth in the present disclosure and attached claims are approximations that can vary as desired. At the very least, each numerical parameter should be construed in light of the number of reported significant digits and by applying ordinary rounding techniques. Ranges can be expressed herein as being from one endpoint to another endpoint or between two endpoints. All ranges disclosed herein are inclusive of the endpoints, unless specified otherwise.

Microelectromechanical systems (MEMS) devices (e.g., motion sensors, pressure sensors, microphones, accelerometers and gyroscopes) are usually disposed over and bonded to an application-specific integrated circuit (ASIC) chip/die to form a MEMS package. The MEMS device often includes a movable element corresponding to an opening or cavity of the ASIC chip. In one example, the MEMS device is a motion sensor and the movable element is referred to as a proof mass (PM).

After fabrication of the MEMS package, a working pressure of the MEMS device (or a vacuum level of the enclosure) is fixed. However, the fixed working pressure (or fixed vacuum level) may not be able to satisfy different requirements of different applications. In addition, a damping effect may be weakened under a high vacuum level. In such conditions, the movable element may collide with an anchor. As a result, stiction between the movable element and the underlying anchor may occur, thereby reducing the reliability of the MEMS package, causing the improper operation of the MEMS device or causing damage to the MEMS device. Accordingly, an approach to control or manage the working pressure of the MEMS package is therefore of primary importance.

Some embodiments of the present disclosure provide a MEMS package that provides one or more improvements over existing approaches. The present disclosure relates to a MEMS package that includes one or more pressure adjustment elements. The pressure adjustment element may be configured to alter or control the working pressure of a working region. Accordingly, stiction or damage may be reduced. Moreover, a performance of the MEMS package may be thereby improved.

Figure 2:
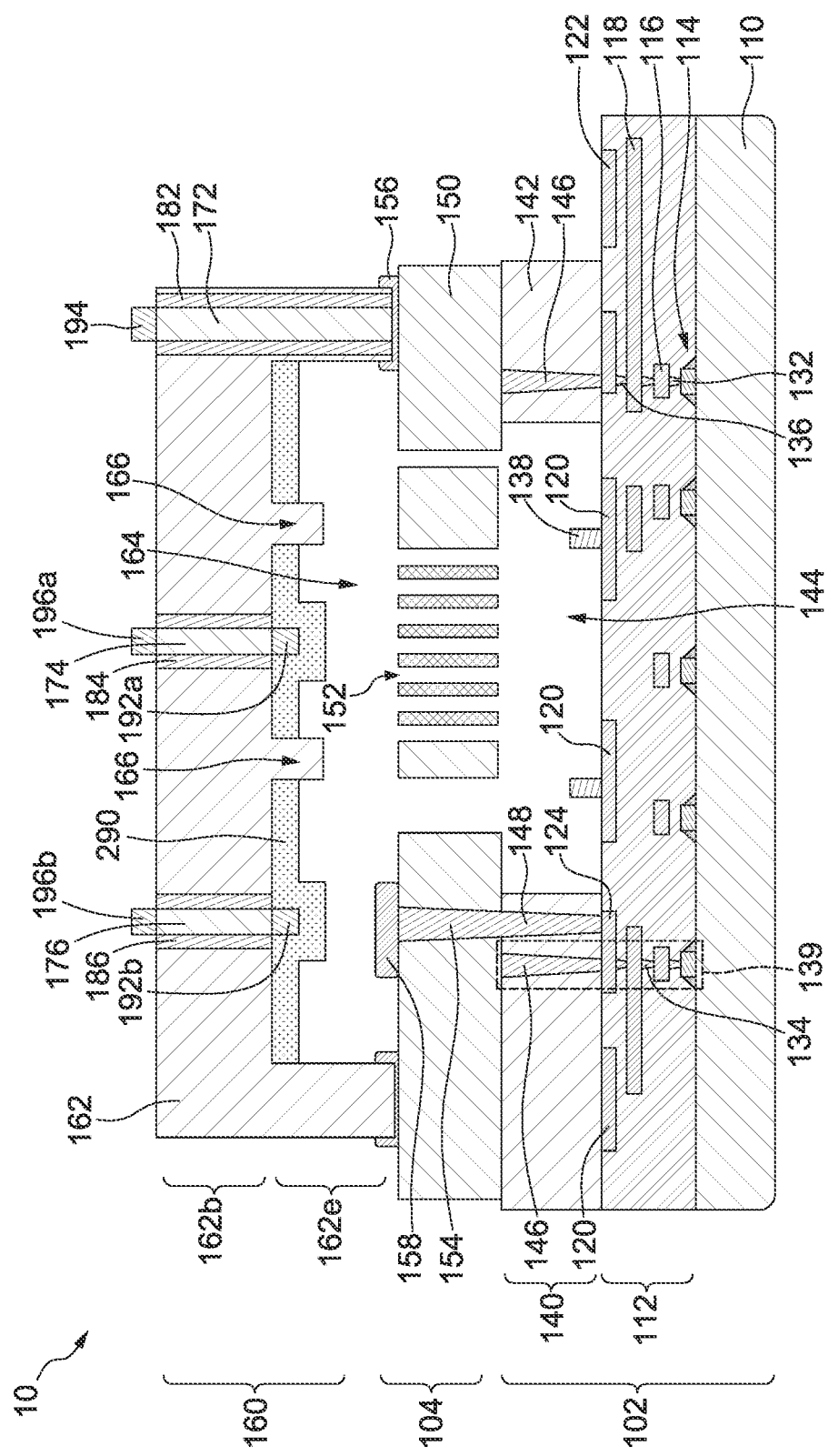
FIG. 2 is a cross-sectional view of a MEMS package according to aspects of one or more embodiments of the present disclosure.

FIG. 1 is a schematic view of a MEMS package 10 according to aspects of one or more embodiments of the present disclosure. FIG. 2 is a cross-sectional view of the MEMS package 10 according to aspects of one or more embodiments of the present disclosure. Referring to FIGS. 1 and 2, the MEMS package 10 includes an integrated circuit (IC) structure 102 and a MEMS device structure 104 over and bonded to the IC structure 102. In some embodiments, the IC structure 102 serves as a carrier substrate for the MEMS device structure 104 and is employed to control an operation of the MEMS device structure 104. The IC structure 102 may be an application-specific integrated circuit (ASIC) wafer or chip.

In some embodiments, the IC structure 102 includes a semiconductor substrate 110. The semiconductor substrate 110 may be made of a semiconductor material, such as silicon, silicon germanium, or the like. In some embodiments, the semiconductor substrate 110 is made of an elementary semiconductor material including silicon or germanium in a single crystal, polycrystal, or amorphous structure. In some other embodiments, the semiconductor substrate 110 is made of a compound semiconductor, such as silicon carbide, gallium arsenide, gallium phosphide, indium phosphide, indium arsenide, an alloy semiconductor such as SiGe or GaAsP, or a combination thereof. The semiconductor substrate 110 may also include multi-layer semiconductors, semiconductor on insulator (SOI) (such as silicon on insulator or germanium on insulator), or a combination thereof. A variety of device elements (not shown) may be formed in the semiconductor substrate 110. Such device elements may include active devices (such as transistors) and/or passive devices (such as resistors and/or capacitors).

Additionally, the IC structure 102 includes an interconnection structure 112 (which is sometimes referred to as a metallization layer or an interconnect layer) disposed over the semiconductor substrate 110. In some embodiments, the interconnection structure 112 includes an inter-layer dielectric (ILD) layer and an overlying inter-metal dielectric (IMD) layer. In order to simplify the diagram, only a single-layer structure is depicted. In some embodiments, active devices (such as transistors) 114 are formed in the interconnection structure 112 and on the top of the semiconductor substrate 110.

In some embodiments, the interconnection structure 112 also includes various metal features formed in a same or different levels of the interconnection structure 112. For example, the metal features may include metal lines 116 (e.g., copper lines) at a first level of the interconnection structure 112, metal lines 118 (e.g., copper lines) at a second level (above the first level) of the interconnection structure 112, and metal lines 120 (e.g., copper lines) and metal pads 122 and 124 (e.g., copper pads) at a third level (above the second level) of the interconnection structure 112 and exposed therefrom. Moreover, the metal features may also include metal vias 132 (e.g., tungsten plugs) electrically connected between the active devices 114 and the metal lines 116, metal vias 134 (e.g., tungsten plugs) electrically connected between the metal lines 116 and the metal lines 118, and metal vias 136 (e.g., tungsten plugs) electrically connected between the metal lines 118 and the metal lines 120 and/or the metal pads 122 or 124.

As shown in FIGS. 1 and 2, a planarization structure 140 is disposed over the interconnection structure 112, in accordance with some embodiments. The planarization structure 140 may be considered as a component of the IC structure 102 and is designed to be aligned with a movable element 152 of a MEMS device structure 104 subsequently disposed thereon. In some embodiments, the planarization structure 140 includes one or more planarization layers 142. The planarization layer 142 may be an insulating layer. For example, the planarization layer 142 is made of silicon oxide, silicon nitride, silicon carbide or silicon oxynitride. Alternatively or additionally, the planarization structure 140 further includes one or more conductive through via structures 146 and 148 (which are sometimes referred to as through insulator vias (TIV)) passing through the planarization layer 142. The through via structures 146 and 148 may be electrically connected to the metal pad 124.

In some embodiments, the planarization structure 140 has an inner sidewall defining a first cavity 144 exposing a portion of the interconnection structure 112. In some embodiments, the metal lines 120 are exposed to the planarization structure 140 via the first cavity 144. Moreover, the metal pad 122 is exposed to the planarization structure 140 to serve as a contact for an external circuit (not shown).

Still referring to FIGS. 1 and 2, the MEMS device structure 104 is disposed over and bonded to the planarization layer 142 of the planarization structure 140, in accordance with some embodiments. In some embodiments, the MEMS device structure 104 is a motion sensor structure and includes a device substrate 150 bonded to the planarization structure 140. In some embodiments, the device substrate 150 includes a movable element 152 (e.g., a proof mass (PM)) disposed over and corresponding to the first cavity 144. The device substrate 150 also includes a fixed portion surrounding the movable element 152, wherein the fixed portion is fixed onto the planarization structure 140 to support the movable element 152.

In some embodiments, the device substrate 150 includes one or more conductive through via structures 154 (such as a TIV) disposed in and penetrating through the device substrate 150. Alternatively or additionally, the through via structure 154 is substantially aligned with the through via structure 148 and is electrically connected to the metal pad 124 via the through via structure 148. In alternative embodiments, a single-layer conductive through via structure may be used instead of the through via structures 154 and 148.

In some embodiments, the MEMS device structure 104 includes a bonding layer 156 over the fixed portion of the device substrate 150. For example, the bonding layer 156 may surround the movable element 152 to provide a mounting region. The bonding layer 156 may be formed by patterning a eutectic material layer (not shown) formed on the device substrate 150. For example, the eutectic material layer is made of germanium, aluminum, copper, titanium, nickel, silver, gold, indium, tin or silicon. In alternative embodiments, the bonding layer 156 is formed of a non-eutectic material.

Moreover, the MEMS device structure 104 includes a metal pad 158 over the fixed portion of the device substrate 150. For example, the metal pad 158 may be electrically connected to the through via structure 154, such that the movable element 152 is controlled by the underlying IC structure 102 via the metal pad 124 and the through via structures 148 and 154 therebetween.

As shown in FIGS. 1 and 2, one or more stoppers 138 are disposed on the exposed interconnection structure 112 in the first cavity 144, in accordance with some embodiments. In some embodiments, the stoppers 138 are arranged in the bottom of the first cavity 144 and integrated with the interconnection structure 112. In some embodiments, the stoppers 138 are arranged directly above the corresponding metal features (e.g., metal lines 120). In alternative embodiments, the stoppers 138 are arranged so that they are not aligned with any metal features. In alternative embodiments, some of the stoppers 138 are aligned with metal features and other of the stoppers 138 are not aligned with any metal features. In some embodiments, two stoppers 138 are arranged directly above the corresponding metal lines 120, respectively.

In some embodiments, each of the stoppers 138 may face the movable element 152. The stoppers 138 may be made of a metal (e.g., Ti, Al, Cu, or an alloy thereof), metal nitride (e.g., TiN), or a conductive polymer (e.g., a conductive polyimide). In alternative embodiments, the stoppers 138 may be made of a same material layer as the planarization layer 142 (which is made of, for example, silicon oxide, silicon nitride, silicon carbide or silicon oxynitride). The stoppers 138 may be configured to prevent over-range movement of the movable element 152 and stop the movable element 152 from sticking to the IC structure 102 during a shock event.

As shown in FIGS. 1 and 2, a cap structure 160 is disposed over the MEMS device structure 104, in accordance with some embodiments. The cap structure 160 has an inner sidewall defining a second cavity 164 facing the movable element 152. The cap structure 160 includes a cap substrate 162. In some embodiments, the cap substrate 162 includes a same material as at least one of the device substrate 150 or the semiconductor substrate 110. In some embodiments, the cap substrate 162 includes a material different from those of the device substrate 150 and the semiconductor substrate 110. The cap substrate 162 may include doped conductive materials. The cap substrate 162 may be heavily doped. The cap substrate 162 may be a conductive substrate.

The cap substrate 162 includes a base portion 162b and an extending portion 162e protruding from a peripheral region of the base portion 162b. The extending portion 162e surrounds a central region of the base portion 162b to define the second cavity 164 over the movable element 152. In some embodiments, the extending portion 162e of the cap substrate 162 is bonded to the MEMS device structure 104 via the bonding layer 156. In alternative embodiments, the cap structure 160 substantially covers an entire top surface of the MEMS device structure 104.

In some embodiments, the cap structure 160 includes stoppers 166 integrated with the base portion 162b of the cap substrate 162. For example, the stoppers 166 may protrude from a surface of the base portion 162b of the cap substrate 162 (i.e., a top of the second cavity 164), thereby facing the movable element 152. The stoppers 166 may or may not be aligned with the stoppers 138. In some embodiments, the stoppers 166 are also configured to prevent over-range movement of the movable element 152 and stop the movable element 152 from sticking to the cap structure 160.

In some embodiments, the cap structure 160 further includes one or more through via structures 172, 174 and 176 penetrating through the cap structure 160, and one or more isolation structures 182, 184 and 186 respectively surrounding and defining the through via structures 172, 174 and 176. The isolation structures 182, 184 and 186 may be formed by selectively etching the cap substrate 162 to form one or more trenches defined by sidewalls of the cap substrate 162. The trenches are subsequently filled with one or more dielectric materials, such as silicon oxide, silicon nitride, silicon carbide or silicon oxynitride, forming the isolation structures 182, 184 and 186. The isolation structures 182, 184 and 186 may penetrate through the cap substrate 162. The isolation structures 182, 184 and 186 may be configured to confine a conductive path of the through via structures 172, 174 and 176.

An enclosure defined by the IC structure 102, the MEMS device structure 104 and the cap structure 160 may be referred to as a working region (or a vacuum region) of the movable element 152. The working region includes the first cavity 144 and the second cavity 164. The working region (i.e., the first cavity 144 and the second cavity 164) surrounds the movable element 152. A working pressure (or vacuum pressure) may be maintained (or fixed) in the working region (i.e., the first and second cavities 144 and 164) after the cap structure 160 is bonded to the MEMS device structure 104.

One or more pressure adjustment elements 190 may be disposed in the second cavity 164. For example, the pressure adjustment element 190 may be disposed on a top of the second cavity 164. In some embodiments, the pressure adjustment element 190 is disposed over an inner surface of the cap substrate 162. For example, the pressure adjustment element 190 covers an exposed surface of the base portion 162b, while an exposed surface of the extending portion 162e is left uncovered by the pressure adjustment element 190. In alternative embodiments, the pressure adjustment element 190 further covers an exposed surface of the stoppers 166.

The pressure adjustment element 190 may be configured to alter the working pressure of the working region in order to help facilitate movement of the movable element 152. The pressure adjustment element 190 may include inorganic materials or organic materials. In some embodiments, the pressure adjustment element 190 includes an outgas material or a porous material. In some embodiments, the pressure adjustment element 190 may include oxides deposited by various methods. For example, the pressure adjustment element 190 includes silicon dioxide. The pressure adjustment element 190 may be configured to increase the working pressure by releasing gases into the working region. The gas molecules may escape from the pressure adjustment element 190 during subsequent operations in order to increase the working pressure.

One or more heating elements 192a and 192b may be disposed in the second cavity 164. For example, the heating elements 192a and 192b may be disposed on the top of the second cavity 164. The heating elements 192a and 192b may be interposed between the cap substrate 162 and the pressure adjustment element 190. The pressure adjustment element 190 is disposed on the heating elements 192a and 192b. The pressure adjustment element 190 may entirely cover top surfaces (or bottom surfaces) of the heating elements 192a and 192b. The pressure adjustment element 190 may further cover sidewall surfaces of the heating elements 192a and 192b.

The heating elements 192a and 192b may respectively be electrically connected to the through via structures 174 and 176. In some embodiments, the heating elements 192a and 192b may respectively be directly disposed on terminals of the through via structures 174 and 176. In some embodiments, the heating element 192a is electrically connected to the heating element 192b. In some embodiments, the heating element 192a is directly (or physically) connected to the heating element 192b. The heating elements 192a and 192b may include heaters, such as resistors, fuses, or other suitable heating devices.

The heating elements 192a and 192b may be configured to provide or generate heat to the pressure adjustment element 190. In some embodiments, the heating elements 192a and 192b directly (or physically) contact the pressure adjustment element 190. In such embodiments, the heat is transferred from the heating elements 192a and 192b to the pressure adjustment element 190 by thermal conduction. In alternative embodiments, the heating elements 192a and 192b may be physically separated from the pressure adjustment element 190. In such embodiments, the heat is transferred from the heating elements 192a and 192b to the pressure adjustment element 190 by thermal convection or thermal radiation.

In some embodiments, one or more conductive pads 194, 196a and 196b are disposed over an outer surface of the cap structure 160. The conductive pads 194, 196a and 196b may respectively be electrically connected to the through via structures 172, 174 and 176. In some embodiments, the conductive pads 194, 196a and 196b may respectively be directly disposed on terminals of the through via structures 172, 174 and 176. Moreover, the conductive pads 194, 196a and 196b may serve as contacts for an external circuit (not shown). In some embodiments, the external circuit creates varying electrical signals which are transferred to the heating elements 192a and 192b through the through via structures 174 and 176. The heating elements 192a and 192b may provide or generate heat to the pressure adjustment element 190 after receiving the electrical signals.

The pressure adjustment element 190 may be heated by the heating elements 192a and 192b through a heating operation. For example, a bias voltage is applied to the heating elements 192a and 192b through the conductive pads 196a and 196b and the through via structures 174 and 176. The pressure adjustment element 190 is subjected to the heat in order to release gas molecules to the working region. Pressure is directly proportional to a number of gas molecules in a space. As the number of gas molecules in the working region (i.e., the first cavity 144 and the second cavity 164) rises, the pressure also rises. Accordingly, the pressure adjustment element 190 is capable of altering the working pressure of the first cavity 144 and the second cavity 164. In some embodiments, one or more seal ring structures 139 may be disposed in the IC structure 102. The seal ring structure 139 may be configured to control or stop the gas molecules from leaking. Accordingly, the target working pressure may be maintained.

A duration of the resulting heating operation may be selected such that the resulting pressure can meet requirements of the movable element 152 of the MEMS package 10. In some embodiments, the duration of the heating operation is substantially in a range from 30 minutes to 90 minutes. Alternatively, the duration of the heating operation is selected such that the pressure adjustment element 190 and the heating elements 192a and 192b reach thermal equilibrium. In some embodiments, the duration of the heating operation is selected such that a maximum working pressure of the working region is reached. In other words, a maximum quantity of gas molecules of the pressure adjustment element 190 are released. A temperature of the heating operation may be selected such that the resulting pressure can meet the requirements of the movable element 152 of the MEMS package 10. In some embodiments, the temperature of the heating operation is substantially in a range from 300 degrees Celsius (° C.) to 500° C. In some embodiments, the working pressure may be increased from 20 millibars (mbar) to 200 mbar.

A thickness and an area of the pressure adjustment element 190 may be selected such that the resulting pressure can meet the requirements of the movable element 152 of the MEMS package 10. In some embodiments, the thickness of the pressure adjustment element 190 is substantially in a range from 1 micrometer (μm) to 10 μm. A thickness and an area of the heating elements 192a and 192b may be selected such that the resulting heat can meet the requirements for the heating the pressure adjustment element 190, so that the resulting pressure can meet the requirements of the movable element 152 of the MEMS package 10. In some embodiments, the thickness of the heating elements 192a and 192b is less than or substantially equal to a half of the thickness of the pressure adjustment element 190. In some embodiments, the area of the pressure adjustment element 190 is greater than or substantially equal to the area of the heating elements 192a and 192b. A contact area between the pressure adjustment element 190 and the heating elements 192a and 192b may be selected such that an efficiency of heating the pressure adjustment element 190 may be increased.

The proposed MEMS package 10 provides advantages. In some comparative embodiments where the pressure adjustment element 190 is absent, the working pressure is fixed after the cap structure 160 is bonded to the MEMS device structure 104. The proposed MEMS package 10 includes the pressure adjustment element 190. The pressure adjustment element 190 may alter the working pressure of the first cavity 144 and the second cavity 164. Accordingly, stiction or damage may be reduced, and better performance of the MEMS package 10 may be achieved.

The structures of the present disclosure are not limited to the above-mentioned embodiments and may have other different embodiments. To simplify the description and for convenience of comparison between each of the embodiments of the present disclosure, identical (or like) components in each of the following embodiments are marked with identical (or like) numerals. For making it easier to compare differences between the embodiments, the following description will detail dissimilarities among different embodiments, while description of identical features, values and definitions will not be repeated.

Figure 3:
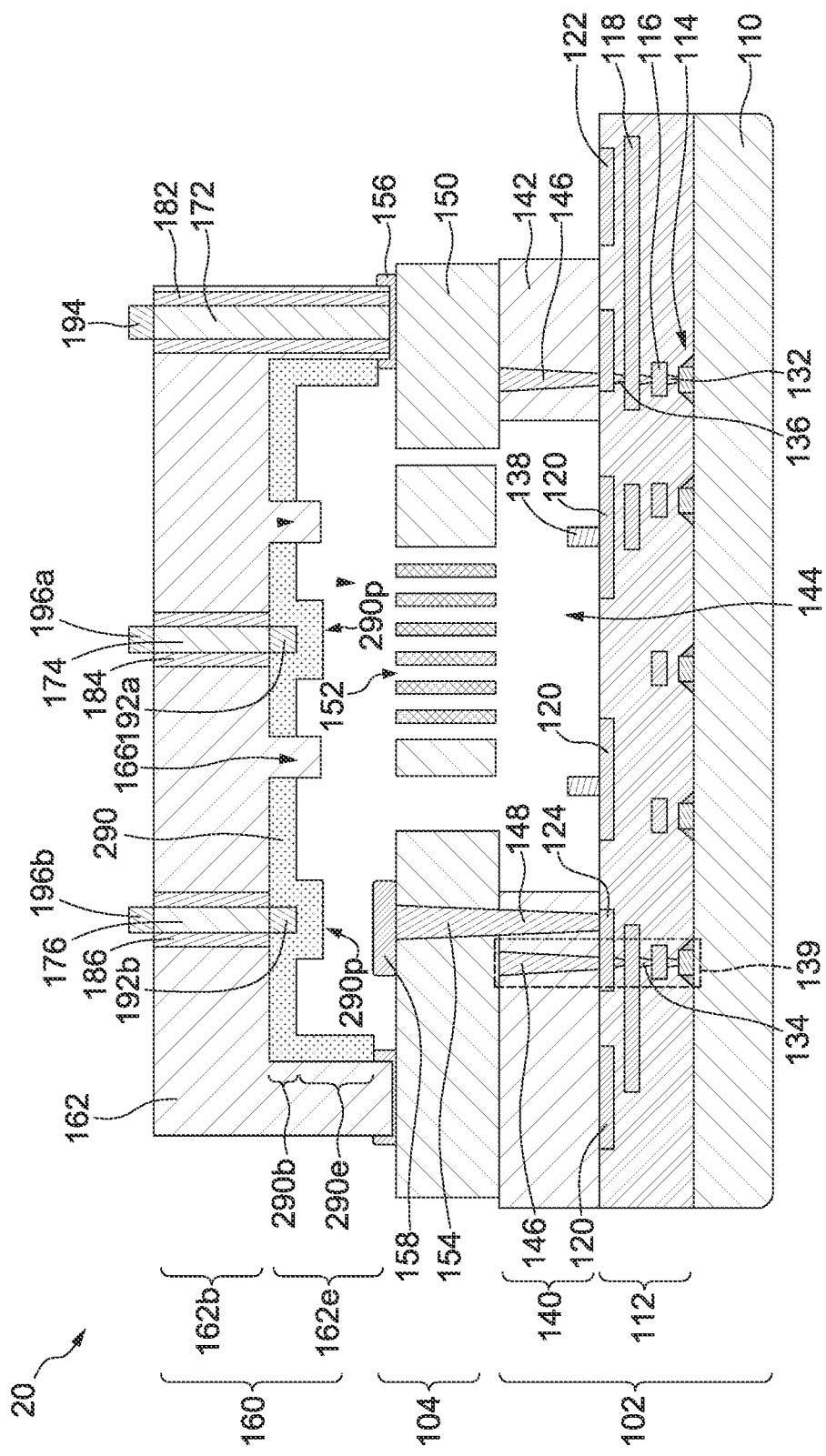
FIG. 3 is a cross-sectional view of a MEMS package according to aspects of one or more embodiments of the present disclosure.

FIG. 3 is a cross-sectional view of a MEMS package 20 according to aspects of one or more embodiments of the present disclosure. Referring to FIG. 3, the MEMS package 20 includes a pressure adjustment element 290. The pressure adjustment element 290 may include any suitable materials that are suitable for the pressure adjustment element 190, as set forth above. The pressure adjustment element 290 includes a base portion 290b and an extending portion 290e protruding from a peripheral region of the base portion 290b. The extending portion 290e surrounds a central region of the base portion 290b to define the second cavity 164 over the movable element 152. In some embodiments, the extending portion 290e is bonded to the MEMS device structure 104 via the bonding layer 156.

The pressure adjustment element 290 further includes one or more protruding portions 290p over the heating elements 192a and 192b. In some embodiments, a height of the extending portion 290e is substantially same as a height of the protruding portion 290p. In other words, the extending portion 290e is substantially level with the protruding portion 290p. Alternatively or additionally, the height of the protruding portion 290p is substantially same as a height of the stoppers 166. In such embodiments, the protruding portion 290p is substantially level with the stoppers 166. In alternative embodiments, the extending portion 290e is substantially level with the protruding portion 290p and the stoppers 166.

The proposed MEMS package 20 provides advantages. The pressure adjustment element 290 of the MEMS package 20 includes extending portions 290e. The pressure adjustment element 290 may increase the working pressure of the first cavity 144 and the second cavity 164 due to the extending portions 290e. Accordingly, a greater range of tunable working pressures of the MEMS package 20 may be achieved.

Figure 4:
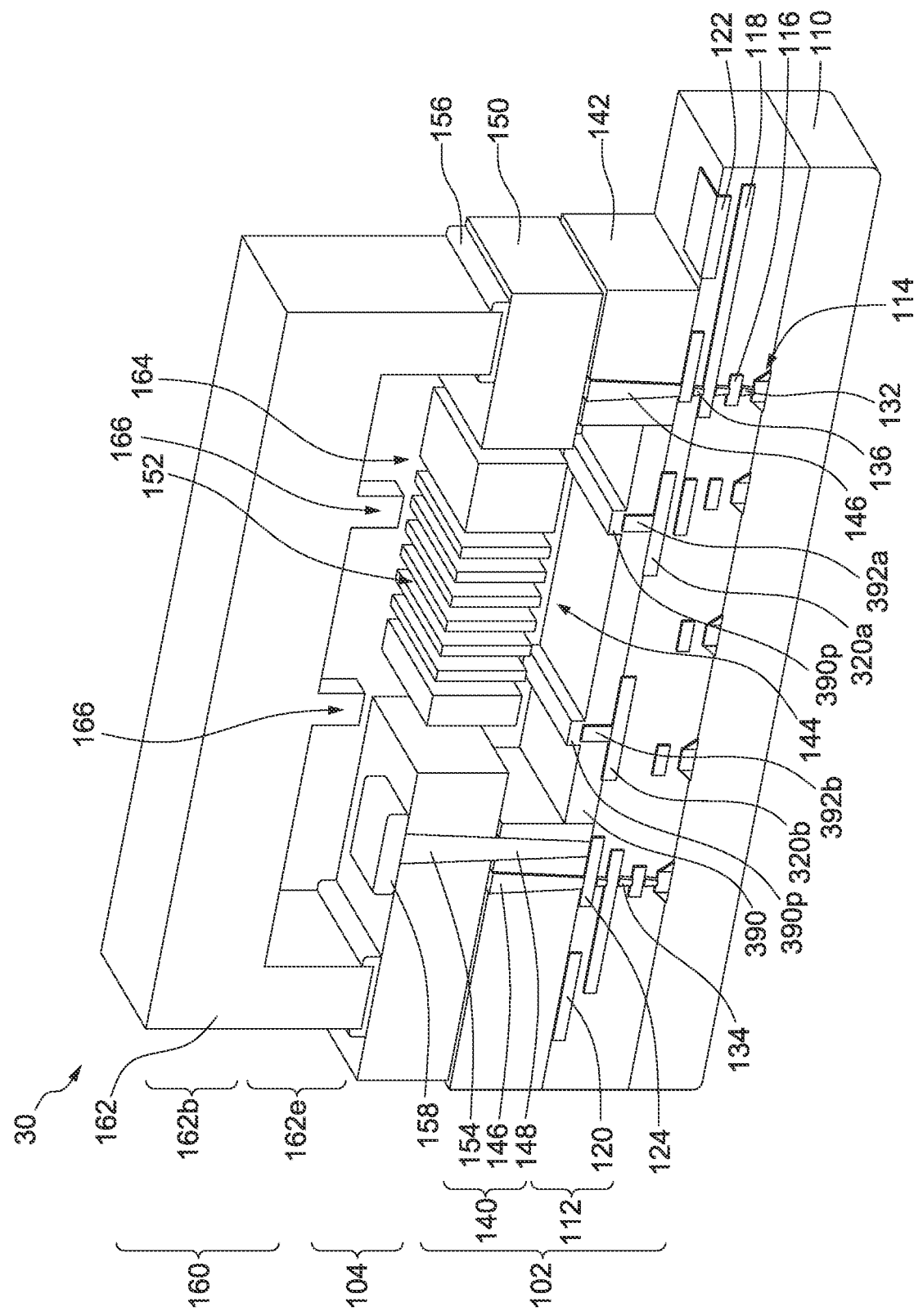
FIG. 4 is a schematic view of a MEMS package according to aspects of one or more embodiments of the present disclosure.
Figure 5:
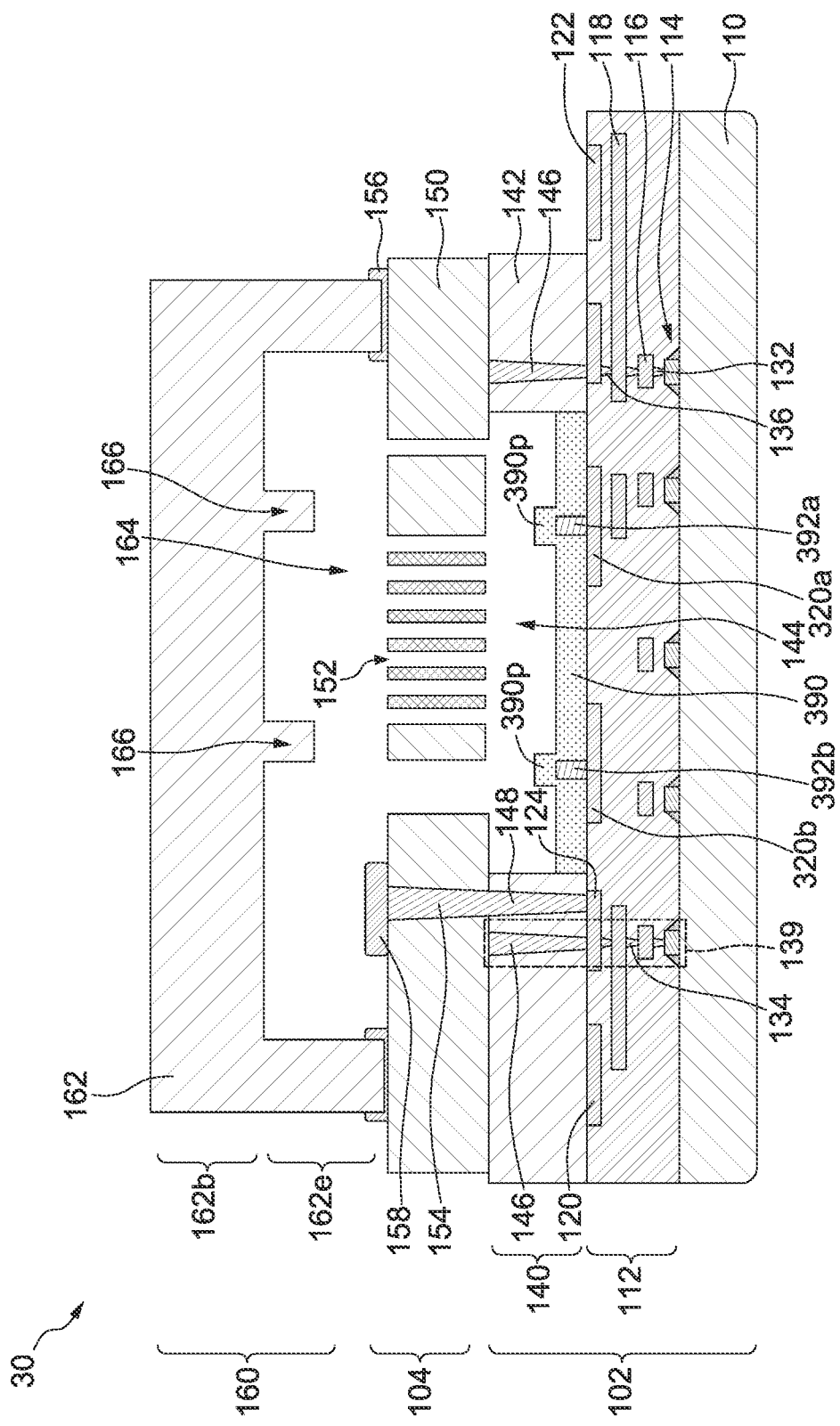
FIG. 5 is a cross-sectional view of a MEMS package according to aspects of one or more embodiments of the present disclosure.

FIG. 4 is a schematic view of a MEMS package 30 according to aspects of one or more embodiments of the present disclosure. FIG. 5 is a cross-sectional view of the MEMS package 30 according to aspects of one or more embodiments of the present disclosure. Referring to FIGS. 4 and 5, the MEMS package 30 includes a pressure adjustment element 390 in the first cavity 144. For example, the pressure adjustment element 390 is disposed on the bottom of the first cavity 144. The pressure adjustment element 390 may be disposed on the interconnection structure 112. In some embodiments, the pressure adjustment element 390 covers an exposed surface of the interconnection structure 112, while an exposed surface of the planarization structure 140 is left uncovered by the pressure adjustment element 390. In some embodiments, the pressure adjustment element 390 further partially covers the inner sidewall of the planarization structure 140. The pressure adjustment element 390 may include any suitable materials that are suitable for the pressure adjustment element 190, as set forth above.

The MEMS package 30 further includes one or more heating elements 392a and 392b disposed in the first cavity 144. For example, the heating elements 392a and 392b may be disposed on the bottom of the first cavity 144. The heating elements 392a and 392b may be interposed between the interconnection structure 112 and the pressure adjustment element 390. The heating elements 392a and 392b may respectively be electrically connected to metal lines 320a and 320b of the interconnection structure 112. In some embodiments, the heating element 392a is electrically connected to the heating element 392b. In some embodiments, the heating element 392a is directly (or physically) connected to the heating element 392b. The heating elements 392a and 392b may include any suitable materials that are suitable for the heating elements 192a and 192b, as set forth above.

In some embodiments, the pressure adjustment element 390 further covers the heating elements 392a and 392b. Alternatively stated, upper surfaces of the heating elements 392a and 392b are covered by the pressure adjustment element 390. In some embodiments, a thickness of the pressure adjustment element 390 is substantially same as or greater than a thickness of the heating elements 392a and 392b.

The MEMS package 30 may further include stoppers (not shown), such as the stoppers 138 as shown in FIG. 2. In some embodiments, a protruding portion 390p of the pressure adjustment element 390 may be further configured as the stopper of the MEMS package 30. In alternative embodiments, where the thickness of the pressure adjustment element 390 is less than the thickness of the heating elements 392a and 392b, the heating elements 392a and 392b may be further configured as the stoppers of the MEMS package 30. In some alternative embodiments, the heating elements 392a and 392b are stoppers same as the stoppers 138, and are electrically connected to one or more heating elements (not shown) in the interconnection structure 112. In such embodiments, the heating elements in the interconnection structure 112 create varying electrical signals which are transferred to the heating elements 392a and 392b through the metal lines 320a and 320b.

The proposed MEMS package 30 provides advantages. The pressure adjustment element 390 of the MEMS package 30 is integrated on the interconnection structure 112. Hence, the heating operation may be easily controlled by the conductive paths of the interconnection structure 112. Furthermore, no through via structures are formed through the cap structure. Accordingly, lower manufacturing costs may be achieved.

Figure 6:
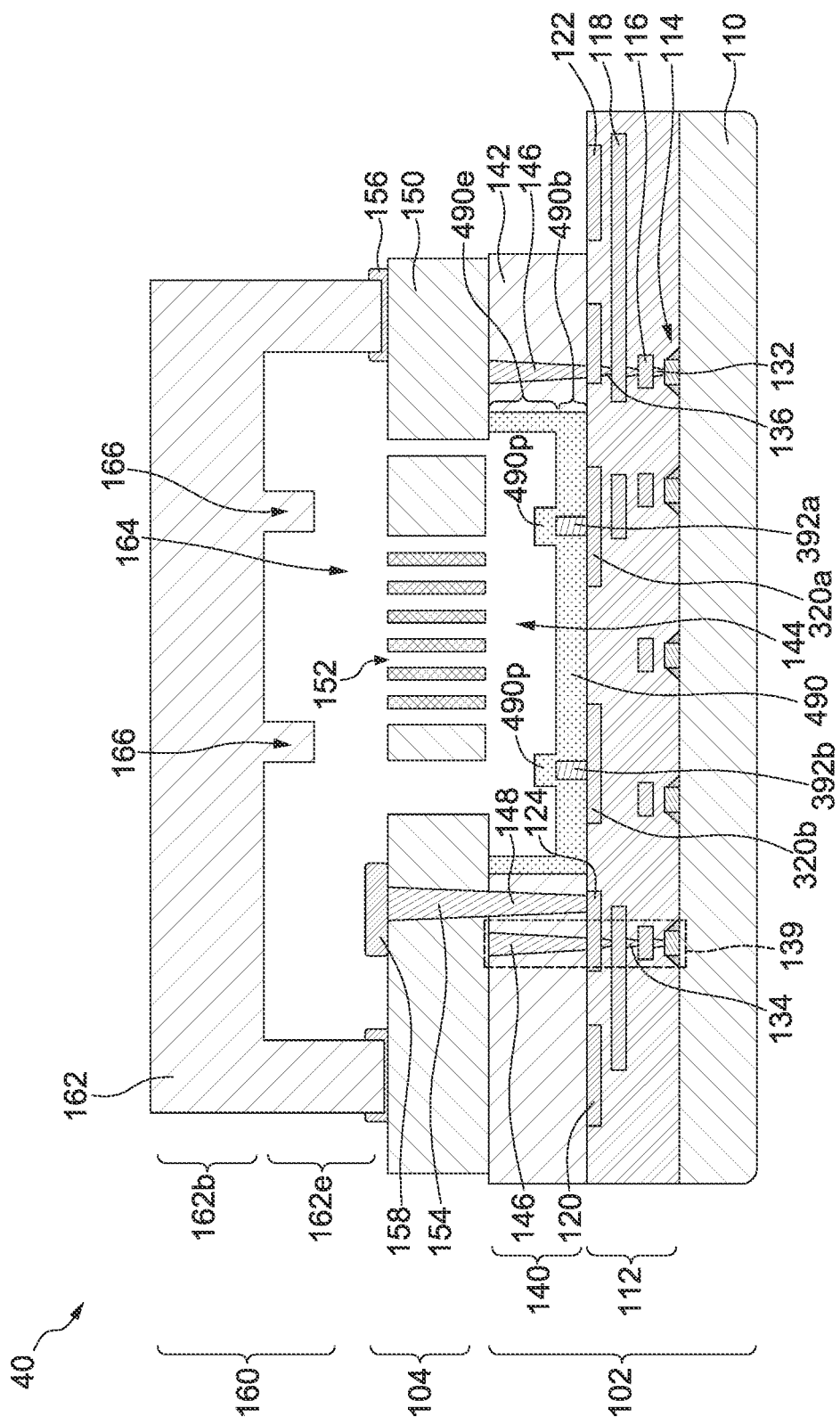
FIG. 6 is a cross-sectional view of a MEMS package according to aspects of one or more embodiments of the present disclosure.

FIG. 6 is a cross-sectional view of a MEMS package 40 according to aspects of one or more embodiments of the present disclosure. Referring to FIG. 6, the MEMS package 40 includes a pressure adjustment element 490. The pressure adjustment element 490 may include any suitable materials that are suitable for the pressure adjustment element 190, as set forth above. The pressure adjustment element 490 includes a base portion 490b and an extending portion 490e protruding from a peripheral region of the base portion 490b. The extending portion 490e surrounds a central region of the base portion 490b to define the first cavity 144. In some embodiments, the extending portion 490e covers the inner sidewall of the planarization structure 140. In some embodiments, the extending portion 490e contacts the MEMS device structure 104. Alternatively stated, the MEMS device structure 104 contacts an edge of the pressure adjustment element 490. The pressure adjustment element 490 further includes one or more protruding portions 490p over the heating elements 392a and 392b. In alternative embodiments, the extending portion 490e is substantially level with the protruding portion 490p.

The proposed MEMS package 40 provides advantages. The pressure adjustment element 490 of the MEMS package 40 includes extending portions 490e. The pressure adjustment element 490 may increase the working pressure of the first cavity 144 and the second cavity 164 due to the extending portions 490e. Accordingly, a greater range of tunable working pressures of the MEMS package 40 may be achieved.

Figure 7:
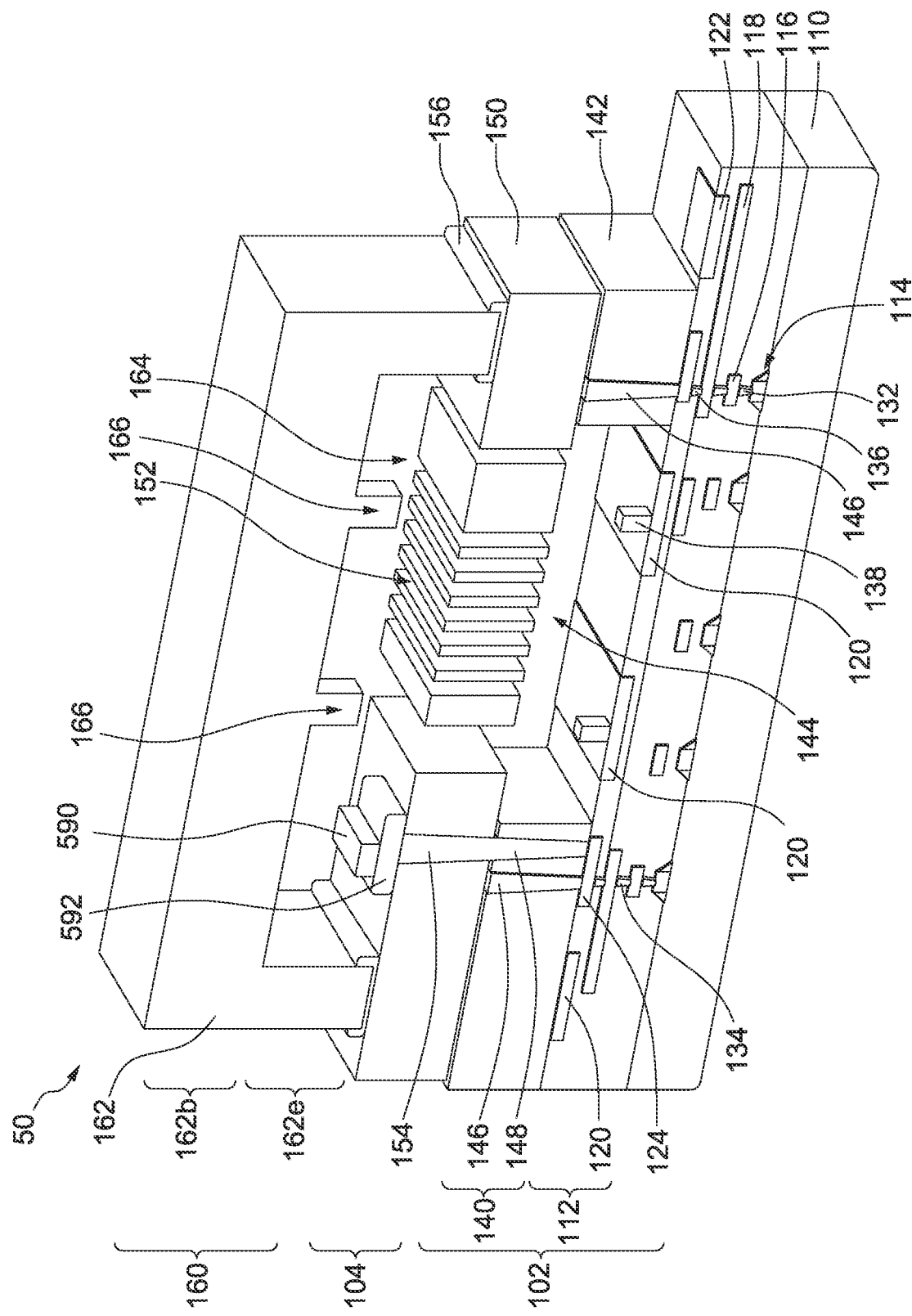
FIG. 7 is a schematic view of a MEMS package according to aspects of one or more embodiments of the present disclosure.
Figure 8:
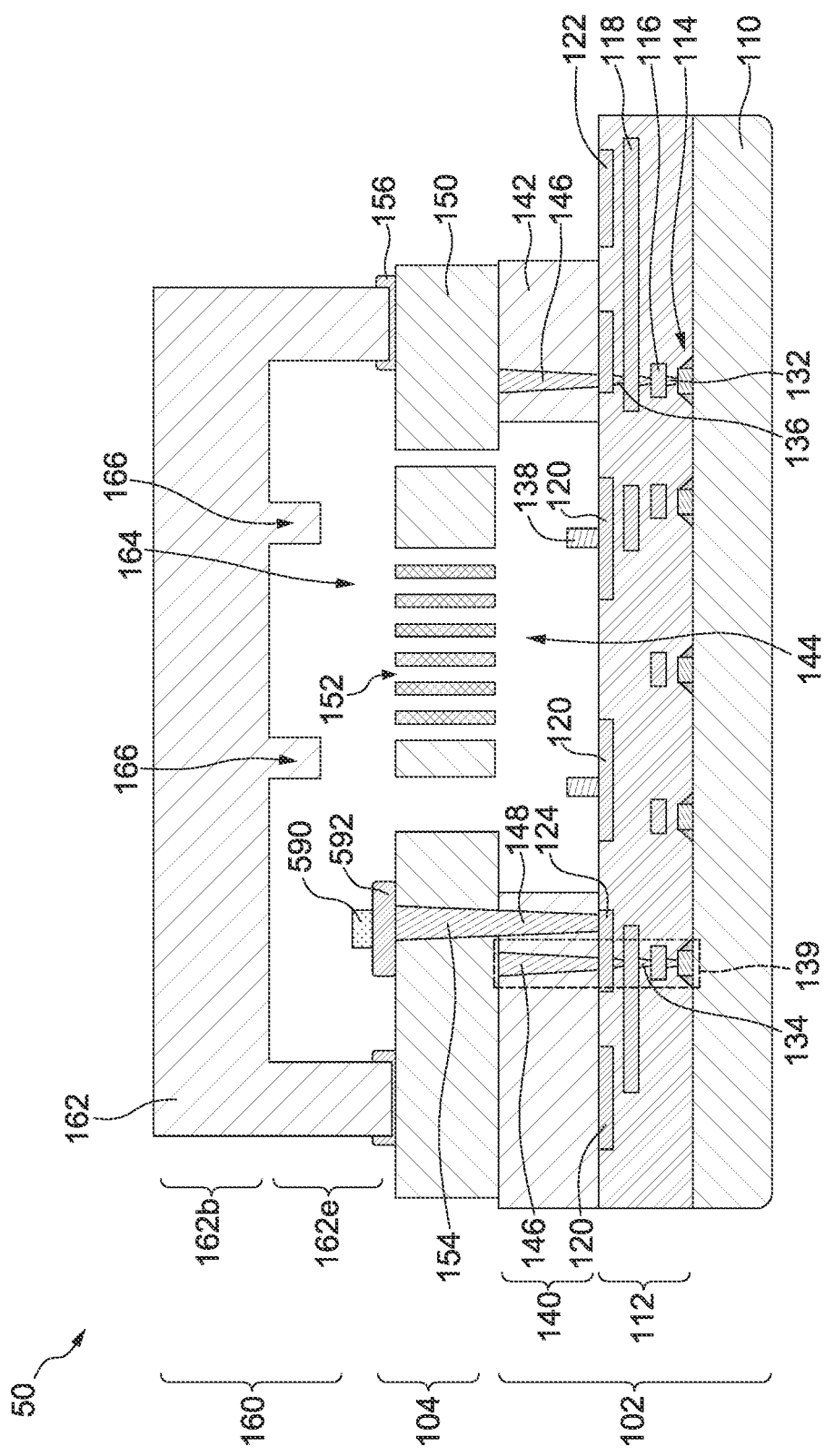
FIG. 8 is a cross-sectional view of a MEMS package according to aspects of one or more embodiments of the present disclosure.

FIG. 7 is a schematic view of a MEMS package 50 according to aspects of one or more embodiments of the present disclosure. FIG. 8 is a cross-sectional view of the MEMS package 50 according to aspects of one or more embodiments of the present disclosure. Referring to FIGS. 7 and 8, the MEMS package 50 includes a pressure adjustment element 590 disposed in the second cavity 164. For example, the pressure adjustment element 590 is disposed on a bottom of the second cavity 164. The pressure adjustment element 590 may be spaced apart from the MEMS device structure 104. Alternatively or additionally, the pressure adjustment element 590 is spaced apart from the cap structure 160. In some embodiments, the pressure adjustment element 590 overlaps an exposed surface of the device substrate 150. The pressure adjustment element 590 may include any suitable materials that are suitable for the pressure adjustment element 190, as set forth above.

The MEMS package 50 further includes one or more heating elements 592 disposed in the second cavity 164. For example, the heating element 592 may be disposed on the bottom of the second cavity 164. The heating element 592 may be interposed between the device substrate 150 and the pressure adjustment element 590. The heating element 592 may be in direct physical contact with the pressure adjustment element 590. The heating element 592 may be disposed on an upper surface of the MEMS device structure 104. The heating element 592 may be electrically connected to the through via structure 154. In some embodiments, the heating element 592 physically contacts the pressure adjustment element 590. The heating element 592 may include any suitable materials that are suitable for the heating elements 192$a$ and 192$b$, as set forth above.

In some embodiments, the pressure adjustment element 590 partially covers the heating element 592. Alternatively stated, a portion of an upper surface of the heating element 592 is covered by the pressure adjustment element 590, while another portion of the upper surface of the heating element 592 is left exposed by the pressure adjustment element 590. In some embodiments, a thickness of the pressure adjustment element 590 is substantially same as or greater than a thickness of the heating element 592. In some embodiments, a width of the pressure adjustment element 590 is substantially same as or less than a width of the heating element 592.

The proposed MEMS package 50 provides advantages. The pressure adjustment element 590 of the MEMS package 50 is integrated on the device substrate 150 of the MEMS device structure 104. Hence, the heating operation may be easily controlled by the conductive paths of the interconnection structure 112 and the MEMS device structure 104. Furthermore, no through via structures are formed through the cap structure. Accordingly, lower manufacturing costs may be achieved.

Figure 9:
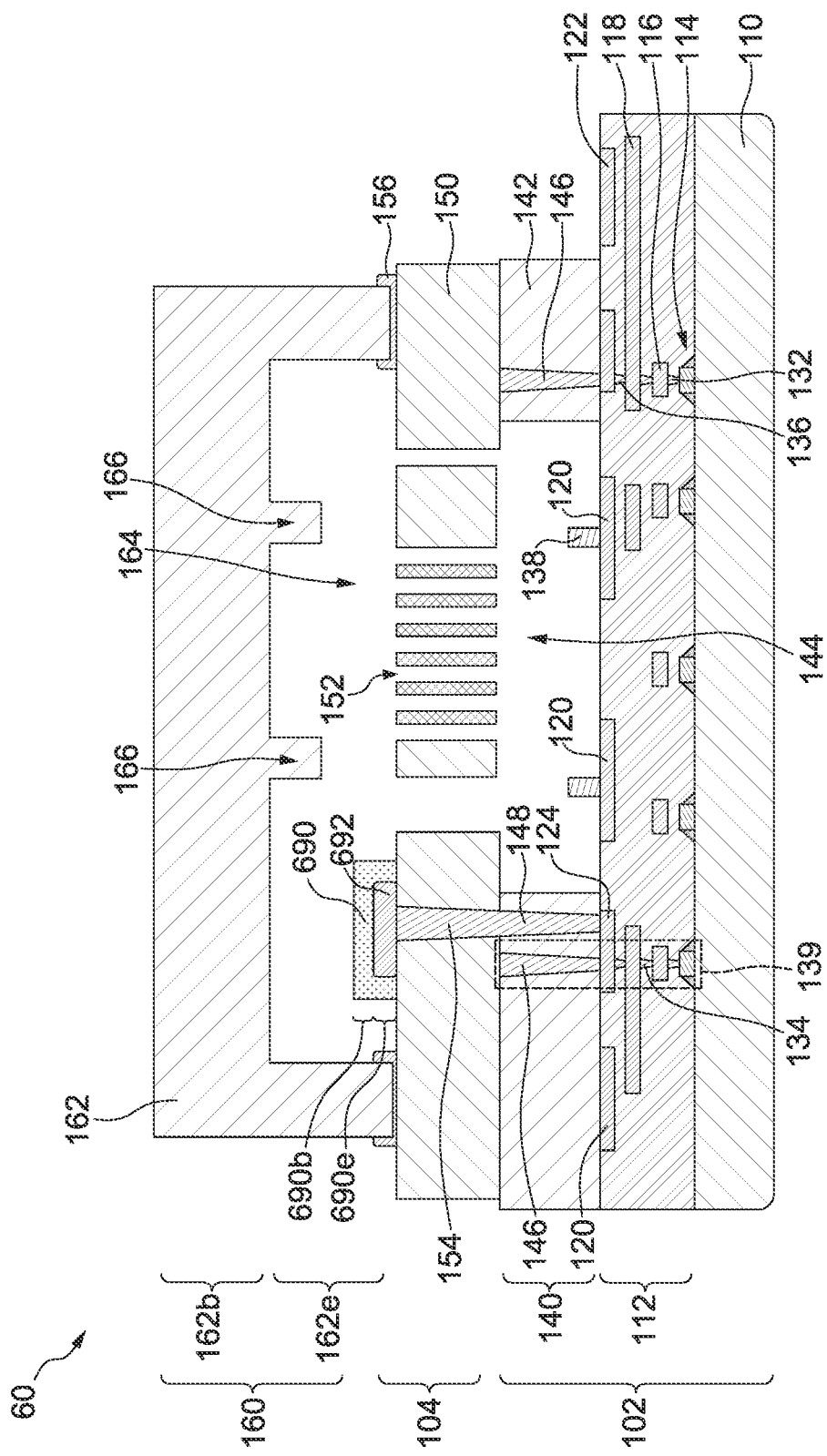
FIG. 9 is a cross-sectional view of a MEMS package according to aspects of one or more embodiments of the present disclosure.

FIG. 9 is a cross-sectional view of a MEMS package 60 according to aspects of one or more embodiments of the present disclosure. Referring to FIG. 9, the MEMS package 60 includes a pressure adjustment element 690 and a heating element 692. The pressure adjustment element 690 may include any suitable materials that are suitable for the pressure adjustment element 190, as set forth above. The pressure adjustment element 690 includes a base portion 690$b$ and an extending portion 690$e$ protruding from a peripheral region of the base portion 690$b$. The extending portion 690$e$ surrounds a central region of the base portion 690$b$ to entirely cover the heating element 692. In some embodiments, the extending portion 690$e$ contacts the device substrate 150.

The proposed MEMS package 60 provides advantages. The pressure adjustment element 690 of the MEMS package 60 includes extending portions 690$e$ and a base portion 690$b$ covering the heating element 692. The pressure adjustment element 690 may increase the working pressure of the first cavity 144 and the second cavity 164 due to the extending portion 690$e$ and the base portion 690$b$. Accordingly, a greater range of tunable working pressures of the MEMS package 60 may be achieved.

Figure 10:
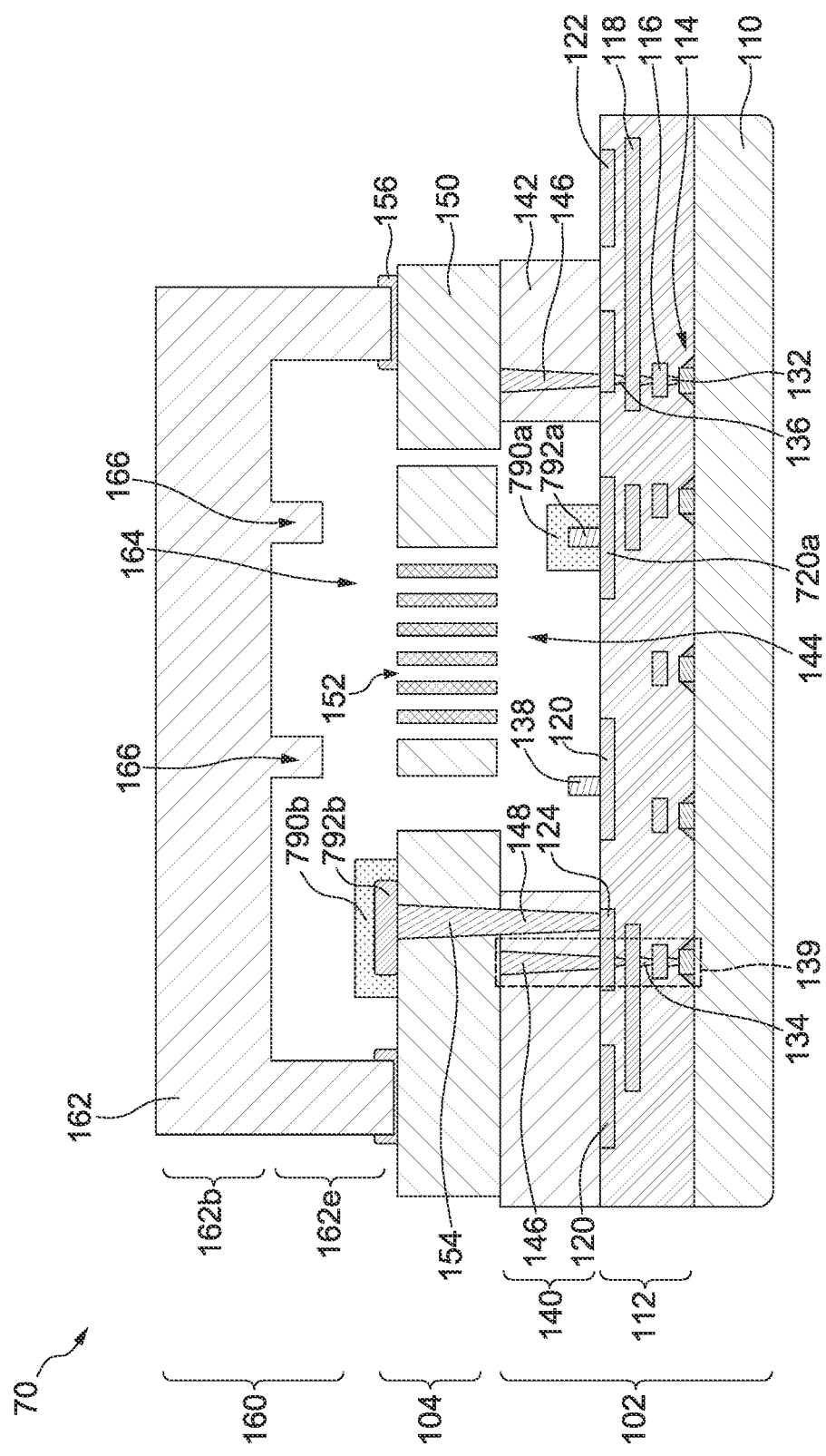
FIG. 10 is a cross-sectional view of a MEMS package according to aspects of one or more embodiments of the present disclosure.

FIG. 10 is a cross-sectional view of a MEMS package 70 according to aspects of one or more embodiments of the present disclosure. Referring to FIG. 10, the MEMS package 70 includes a pressure adjustment element 790$a$ disposed in the first cavity 144 and a pressure adjustment element 790$b$ disposed in the second cavity 164. The MEMS package 70 further includes a heating element 792$a$ disposed in the first cavity 144 and a heating element 792$b$ disposed in the second cavity 164. The pressure adjustment element 790$a$ may entirely cover the heating element 792$a$. Moreover, the pressure adjustment element 790$b$ may entirely cover the heating element 792$b$. The pressure adjustment elements 790$a$ and 790$b$ may include any suitable materials that are suitable for the pressure adjustment element 190, as set forth above. Furthermore, the heating elements 792$a$ and 792$b$ may include any suitable materials that are suitable for the heating elements 192$a$ and 192$b$, as set forth above.

The proposed MEMS package 70 provides advantages. The MEMS package 70 includes two pressure adjustment elements (i.e., the pressure adjustment elements 790$a$ and 790$b$) disposed in different cavities (i.e., the first cavity 144 and the second cavity 164). Accordingly, a shorter duration for achieving a desired working pressure may be expected.

The proposed MEMS packages provide one or more improvements over existing approaches. The proposed MEMS package includes one or more pressure adjustment elements and one or more heating elements. The pressure adjustment elements and the heating elements may be disposed on an IC structure, a MEMS device structure and/or a cap structure. Due to heating of the pressure adjustment element, the pressure adjustment element may release gas molecules into a working region. Hence, a working pressure of the working region of a moving element may be altered. The resulting working pressure can meet different requirements of the MEMS packages by altering heating duration, changing a dimension (e.g., thickness, area) of the pressure adjustment element, and/or varying a heating temperature. Accordingly, an ideal vacuum level may be achieved, stiction or damage may be reduced, and better performance of the MEMS packages may be expected.

In accordance with some embodiments of the present disclosure, a MEMS package is provided. The MEMS package includes a semiconductor substrate, a metallization layer, a planarization structure, a MEMS device structure, a cap structure and a pressure adjustment element. The metallization layer is disposed over the semiconductor substrate. The planarization structure is disposed over the metallization layer. The planarization structure has an inner sidewall defining a first cavity exposing the metallization layer. The MEMS device structure is bonded to the planarization structure. The MEMS device structure includes a movable element over the first cavity. The cap structure is bonded to the MEMS device structure. The cap structure has an inner sidewall defining a second cavity facing the movable element. The pressure adjustment element is disposed in the second cavity.

In accordance with some embodiments of the present disclosure, a MEMS package is provided. The MEMS package includes a semiconductor substrate, a metallization layer, a planarization structure, a MEMS device structure and a pressure adjustment element. The metallization layer is disposed over the semiconductor substrate. The planarization structure is disposed over the metallization layer. The planarization structure has an inner sidewall defining a first cavity exposing the metallization layer. The MEMS device structure is bonded to the planarization structure. The MEMS device structure includes a movable element over the first cavity. The pressure adjustment element is disposed in the first cavity.

In accordance with some embodiments of the present disclosure, a MEMS package is provided. The MEMS package includes a semiconductor substrate, a MEMS device structure, a cap structure and a pressure adjustment element. The MEMS device structure is disposed over the semiconductor substrate. The MEMS device structure includes a movable element. The cap structure is bonded to the MEMS device structure. The cap structure has an inner sidewall defining a first cavity facing the movable element. The pressure adjustment element is disposed in the first cavity.

The foregoing outlines structures of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A microelectromechanical systems (MEMS) package, comprising:
   a metallization layer over a semiconductor substrate;
   a planarization structure over the metallization layer, having an inner sidewall defining a first cavity exposing the metallization layer;
   a MEMS device structure bonded to the planarization structure, wherein the MEMS device structure comprises a movable element over the first cavity;
   a cap structure bonded to the MEMS device structure, having an inner sidewall defining a second cavity facing the movable element;
   a pressure adjustment element disposed in the second cavity; and
   a stopper protruded from the cap structure toward the second cavity and exposed through the pressure adjustment element.

2. The MEMS package of claim 1, further comprising:
   a heating element disposed in the second cavity.

3. The MEMS package of claim 2, wherein the heating element is disposed on an inner surface of the cap structure.

4. The MEMS package of claim 3, wherein the pressure adjustment element is disposed on the heating element.

5. The MEMS package of claim 4, wherein the heating element has a bottom surface facing the second cavity, and the pressure adjustment element entirely covers the bottom surface of the heating element.

6. The MEMS package of claim 5, wherein the pressure adjustment element further covers sidewall surfaces of the heating element.

7. The MEMS package of claim 2, further comprising:
   a through via structure penetrating through the cap structure and electrically connected to the heating element.

8. A microelectromechanical systems (MEMS) package, comprising:
   a semiconductor substrate;
   a MEMS device structure over the semiconductor substrate, wherein the MEMS device structure comprises a movable element;
   a cap structure bonded to the MEMS device structure, the cap structure having an inner sidewall defining a first cavity facing the movable element;
   a pressure adjustment element disposed in the first cavity; and
   a stopper protruded from the cap structure toward the first cavity and exposed through the pressure adjustment element.

9. The MEMS package of claim 8, wherein the pressure adjustment element is spaced apart from the MEMS device structure.

10. The MEMS package of claim 8, further comprising:
    a heating element disposed in the first cavity, wherein the heating element is in direct physical contact with the pressure adjustment element.

11. The MEMS package of claim 8, wherein the pressure adjustment element covers a portion of a top surface of the first cavity.

12. The MEMS package of claim 11, wherein the pressure adjustment element covers sidewalls of the first cavity.

13. The MEMS package of claim 8, further comprising a second cavity between the MEMS device structure and the semiconductor substrate.

14. The MEMS package of claim 8, further comprising a through via structure penetrating through the cap structure.

15. The MEMS package of claim 14, further comprising a conductive pad disposed over an outer surface of the cap structure, wherein the conductive pad is electrically connected to the through via structure.

16. A microelectromechanical systems (MEMS) package, comprising:
    a metallization layer over a semiconductor substrate;
    a MEMS device structure over the metallization layer;
    a cap structure over the MEMS device structure;
    a first cavity between the metallization layer and the MEMS device structure;
    a second cavity between the MEMS device structure and the cap structure;
    a pressure adjustment element disposed over a top surface of the second cavity;
    a first stopper protruded from the cap structure toward the second cavity and exposed through the pressure adjustment element; and
    a heating element disposed in the cap structure and coupled to the pressure adjustment element.

17. The MEMS package of claim 16, wherein the pressure adjustment element covers sidewalls of the second cavity.

18. The MEMS package of claim 16, further comprising a second stopper protruded from the metallization layer toward the first cavity.

19. The MEMS package of claim 16, further comprising a through via structure penetrating through the cap structure and electrically connected to the heating element.

20. The MEMS package of claim 19, further comprising an isolation structure disposed between the through via structure and the cap structure.

* * * * *